United States Patent
Noui-Mehidi (10) Patent No.: US 9,032,815 B2
(45) Date of Patent: May 19, 2015

(54) PULSATING FLOW METER HAVING A BLUFF BODY AND AN ORIFICE PLATE TO PRODUCE A PULSATING FLOW

(75) Inventor: Mohamed Nebil Noui-Mehidi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 589 days.

(21) Appl. No.: 13/253,724

(22) Filed: Oct. 5, 2011

(65) Prior Publication Data
US 2013/0086994 A1    Apr. 11, 2013

(51) Int. Cl.
*G01F 1/32*   (2006.01)
*G01F 1/42*   (2006.01)

(52) U.S. Cl.
CPC ............... *G01F 1/3218* (2013.01); *G01F 1/42* (2013.01)

(58) Field of Classification Search
None
See application file for complete search history.

(56) References Cited

U.S. PATENT DOCUMENTS

| | | | |
|---|---|---|---|
| 3,535,927 A | 10/1970 | Mahon et al. | |
| 3,589,185 A | 6/1971 | Burgess | |
| 3,776,033 A * | 12/1973 | Herzl | 73/861.22 |
| 3,940,986 A | 3/1976 | Yamasaki et al. | |
| 4,003,253 A | 1/1977 | Yard | |
| 4,418,579 A | 12/1983 | Harrington | |
| 4,730,500 A | 3/1988 | Hughes | |
| 4,896,541 A | 1/1990 | Hughes | |
| 5,127,274 A | 7/1992 | Lew | |
| 5,654,502 A | 8/1997 | Dutton | |
| RE35,639 E | 10/1997 | Vander Heyden et al. | |
| 5,826,659 A | 10/1998 | Hershberger | |
| 5,942,696 A | 8/1999 | Kleven | |
| 6,128,072 A | 10/2000 | Kiel et al. | |
| 6,170,338 B1 | 1/2001 | Kleven et al. | |
| 6,186,179 B1 | 2/2001 | Hill | |
| 6,220,103 B1 | 4/2001 | Miller et al. | |
| 6,234,030 B1 | 5/2001 | Butler | |
| 6,275,284 B1 | 8/2001 | Kiel et al. | |
| 6,345,536 B1 | 2/2002 | Morrison et al. | |
| 6,412,353 B1 | 7/2002 | Kleven et al. | |
| 6,422,092 B1 | 7/2002 | Morrison et al. | |
| 6,435,041 B1 | 8/2002 | Bhowmick et al. | |
| 6,484,590 B1 | 11/2002 | Kleven et al. | |
| 6,516,879 B1 | 2/2003 | Hershberger | |
| 6,598,457 B2 | 7/2003 | Sullivan et al. | |

(Continued)

FOREIGN PATENT DOCUMENTS

| | | |
|---|---|---|
| DE | 578878 | 6/1933 |
| DE | 1037160 | 8/1958 |
| JP | 55023497 | 2/1980 |

OTHER PUBLICATIONS

International Search Report from PCT/US2012/058848 mailed Jan. 25, 2013.

*Primary Examiner* — Harshad R Patel
(74) *Attorney, Agent, or Firm* — Bracewell & Giuliani LLP; Constance Gall Rhebergen (57) ABSTRACT

A flow system based on pulsating mechanism that has better accuracy compared to conventional vortex meters due to the fact that the pulsations generated have increased signal response and lower frequency, both of which are favorable for a high accuracy measurement. Certain embodiments include a housing, a bluff body, an orifice plate, and means for detecting a pulsating frequency of pulsating flow and determining the fluid flow rate based on the detected pulsating frequency. In certain embodiments, the housing can include an outer shell, an inlet, and an outlet.

31 Claims, 5 Drawing Sheets

(56) References Cited

U.S. PATENT DOCUMENTS

| | | |
|---|---|---|
| 6,651,512 B1 | 11/2003 | Kleven et al. |
| 6,651,514 B2 * | 11/2003 | Zanker ............... 73/861.52 |
| 6,658,945 B1 | 12/2003 | Kleven et al. |
| 6,705,159 B2 | 3/2004 | Lenzing |
| 6,705,397 B2 | 3/2004 | Hershberger |
| 6,718,997 B2 | 4/2004 | Biszko |
| 6,725,731 B2 * | 4/2004 | Wiklund et al. ........ 73/861.52 |
| 6,826,965 B1 | 12/2004 | Liu |
| 6,843,110 B2 | 1/2005 | Deane et al. |
| 6,868,741 B2 | 3/2005 | Harman |
| 6,895,813 B2 | 5/2005 | Mattar |
| 6,957,586 B2 | 10/2005 | Sprague |
| 6,973,841 B2 | 12/2005 | Foster |
| 7,058,549 B2 | 6/2006 | Gysling et al. |
| 7,073,394 B2 | 7/2006 | Foster et al. |
| 7,082,840 B2 | 8/2006 | Bengtson |
| 7,135,107 B2 | 11/2006 | Palmer |
| 7,143,638 B1 | 12/2006 | Scott |
| 7,197,408 B2 | 3/2007 | Ferreira et al. |
| 7,212,928 B2 | 5/2007 | Cook et al |
| 7,258,024 B2 | 8/2007 | Dimarco et al. |
| 7,284,450 B2 * | 10/2007 | Orleskie et al. ........... 73/861.52 |
| 7,290,450 B2 | 11/2007 | Brown et al. |
| 7,331,219 B2 | 2/2008 | Deuker |
| 7,366,621 B2 | 4/2008 | Sprague |
| 7,431,846 B2 | 10/2008 | Palmer |
| 7,444,885 B2 | 11/2008 | Keese et al. |
| 7,516,023 B2 | 4/2009 | Ferreira et al. |
| 7,533,579 B2 | 5/2009 | Lewicke |
| 7,580,801 B2 | 8/2009 | Unsworth et al. |
| 7,637,170 B2 | 12/2009 | Foster et al. |
| 7,644,633 B2 | 1/2010 | Schmidt et al. |
| 7,654,151 B2 | 2/2010 | Agar et al. |
| 7,660,689 B2 | 2/2010 | Mattar |
| 7,716,973 B1 | 5/2010 | Joy |
| 7,716,994 B2 | 5/2010 | Mattar et al. |
| 7,853,415 B2 | 12/2010 | Cook et al. |
| 2004/0107778 A1 | 6/2004 | Berberig |
| 2007/0220994 A1 | 9/2007 | Keese |
| 2011/0061469 A1 | 3/2011 | Maahs |

* cited by examiner

PULSATING FLOW METER HAVING A BLUFF BODY AND AN ORIFICE PLATE TO PRODUCE A PULSATING FLOW

TECHNICAL FIELD OF THE INVENTION

The present invention relates to a flow meter that is operable for imparting a pulsating flow on process fluids.

BACKGROUND OF THE INVENTION

When a fluid passes by an object or obstruction, oscillations can occur. Examples of these oscillations in nature include the whistling caused by wind blowing by the branches of trees, the swirls produced downstream of a rock in a rapidly flowing river, and the waving of a flag in the wind. Note that in all of these examples, when the flow is slowed, the oscillations stop. That is, the whistling stops when the wind dies down, the water flows calmly around the rock when the river is not flowing rapidly, and the flag does not wave in a mild breeze.

Vortex flow meters operate under the same principle. Vortex flow meters are usually installed in-line within a process-fluid flow conduit to measure the flow rate of a fluid. Vortex flow meters are based on a fluid instability known as vortex shedding, which occurs when a fluid flows around an obstacle, usually called a bluff body, inside a pipe system. Since the fluid flow does not adhere to the obstacle contour due to the boundary layer effect, flow separation occurs behind the bluff body thereby forming vortices where the pressure is low behind the body. These vortices alternate downstream to generate flow instability called Karman vortex street. These vortices are shed alternately from one side to the other of the bluff body at a defined frequency that is proportional to the flow rate in the pipe. Similar to the waving flag, the frequency of the vortex shedding increases with increasing fluid flow. In these types of meters, the differential pressure resulting from the vortices being formed and shed is sensed by sensors that measure a frequency proportional to the vortex shedding mechanism and a transmitter generates a flow measurement signal based on the measured frequency.

Figure 1:
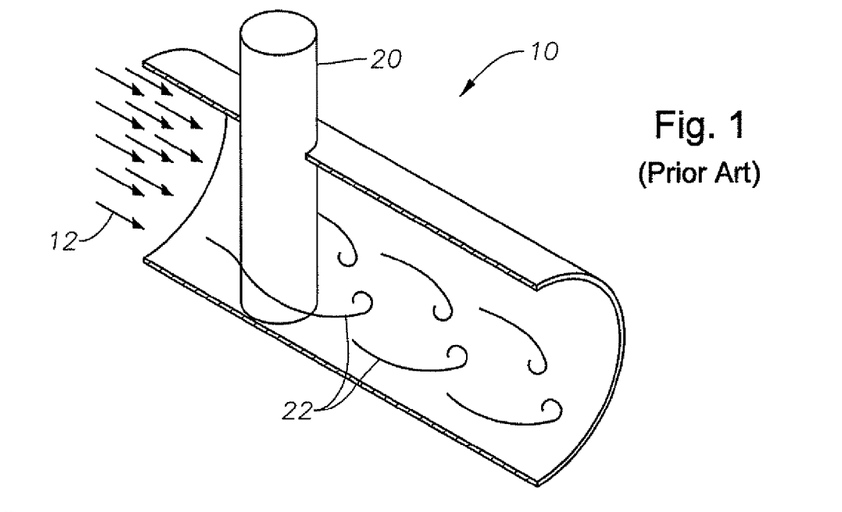
FIG. 1 is a perspective view of a vortex flow meter in accordance with those known in the prior art.
Figure 2:
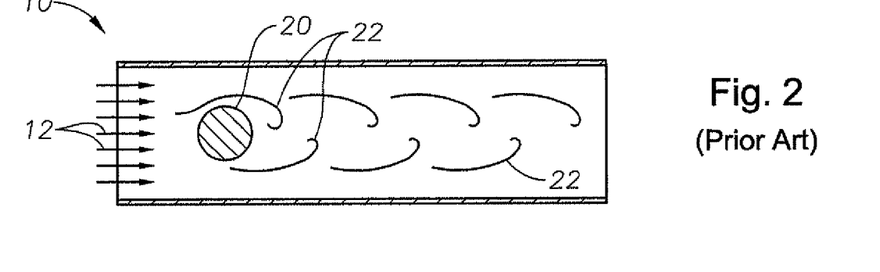
FIG. 2 is a top sectional view of a vortex flow meter in accordance with those known in the prior art.
Figure 3:
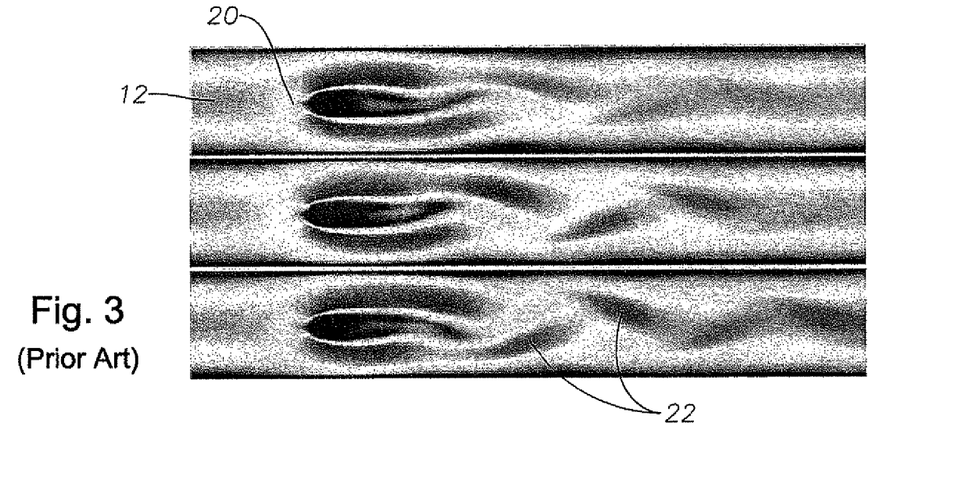
FIG. 3 displays a computational flow simulation of the Karman vortex street using a vortex flow meter in accordance with those known in the prior art.

FIG. 1 shows an isometric view of a vortex flow meter 10 known heretofore. Process fluid 12 enters vortex flow meter 10 and flows past bluff body 20, which in turn causes the formations of alternating vortices 22. FIG. 2 shows a top view of the same vortex flow meter 10. FIG. 3 shows a computational flow simulation of the Karman vortex street. As can be seen, the vortices are generated behind the bluff body in alternate form. Additionally, for a defined geometry of the bluff body, the Karman street vortex frequency is proportional to flow rate.

Vortex flow meters measure the velocity of liquids, gases and vapors in pipes, such as water, cryogenic liquids, boiler feed water, hydrocarbons, chemicals, air, nitrogen, industrial gases, and steam. However, a known shortfall for vortex flow meters exists in applications where flow measurement is required near the bottom of the vortex flow meter's range because the sensors within the vortex flow meters turn off at low flow rates. The velocity at which the sensors turn off is typically 0.3 m/sec (1 ft/sec) for liquids; however, for gases/vapors, the cut off is much higher due to the relatively low density of the gas/vapor required to operate the sensing system. Therefore, current flow meters do not allow for low flow rates for gases.

Generally speaking, as the size of the bluff body or meter housing decreases, the vortex frequency increases. Furthermore, as the frequency increases, the pressure sensor signal strength is reduced. Therefore, reduced housing sizes results in reduced pressure sensor signal strengths. Naturally, this thereby limits the acceptable range of meter sizes.

An additional problem affecting the accuracy of vortex flow meters is noise. Noise generated by pumps, valves, upstream flow restrictions, compressors, and the like can cause the sensor to read higher output signals, thereby resulting in an inaccurate flow rate reading. The effect of process noise on the reading can be reduced when the sensor's signal-to-noise ratio is at a maximum value. With liquids, the noise problem is not as big of a problem; however, steam and gas fluids generate relatively lower sensor signal strengths, which can be difficult to differentiate from process noise, particularly at low flow rates.

Filters have been use to help eliminate process noise; however, these filters raise the threshold value of the low flow cut off and lead to further misreadings. The result is that the more filtering used to eliminate process noise, the less the net range of the flow meter.

Vortex frequencies typically range from one to thousands of pulses per second, depending upon the flow velocity, the character of the process fluid, and the size of the meter. In gas service, for example, frequencies tend to be about 10 times higher than in liquid applications. (Vortex meters have flow limits based upon the flowing density multiplied by the squared value of the flowing velocity. Therefore with gas applications (with lower density values than liquids), the maximum velocity and consequent frequency limit is much higher than liquid applications.

Therefore, it would be advantageous to have a flow meter that was more accurate than conventional vortex flow meters, particularly for fluids that suffer from problems associated with low flow rates or low densities.

SUMMARY OF THE INVENTION

The present invention is directed to a pulsating flow meter and a method that satisfies at least one of these needs. In one embodiment, the pulsating flow meter can include a housing, a bluff body, and an orifice plate. In one embodiment, the housing defines an interior, a longitudinal length, a radial housing diameter, and a longitudinal axis. In one embodiment, the housing can include an outer shell, an inlet for receiving process fluid from the process fluid flow conduit into the interior of the housing, and an outlet for delivering process fluid from the interior of the housing to the process fluid flow conduit. In one embodiment, the bluff body is disposed within the housing. The bluff body is shaped such that the bluff body is operable to impart a vortex flow pattern on process fluid that flows past the bluff body, wherein the vortex flow pattern has a vortex frequency. The orifice plate is disposed within the housing and has an orifice. In one embodiment, the orifice plate is located down stream of the bluff body. The orifice plate is located a defined distance from the bluff body such that the orifice plate is operable to impart a pulsating flow on process fluid as a result of passing through the orifice, wherein the pulsating flow has a pulsating frequency. In another embodiment, the pulsating flow meter can include means to detect the pulsating frequency of the pulsating flow and determine the fluid flow rate based on the detected pulsating frequency.

In another embodiment, the pulsating flow meter can further include means for coupling the pulsating flow meter in fluid connection with the process fluid flow conduit. In another embodiment, the means to detect the pulsating frequency and determine the fluid flow rate based on the detected pulsating frequency further includes a sensor operable to detect the pulsating frequency of the pulsating flow by sensing pressure differentials resulting from the pulsating flow, a transmitter in communication with the sensor, the transmitter operable to generate a flow measurement signal based on the pressure differentials sensed by the sensor, and a processor in communication with the transmitter, the processor operable to receive the flow measurement signal and determine the fluid flow rate. In another embodiment, the pulsating flow meter can further include a display means in communication with the processor, wherein the display means is operable to display the fluid flow rate.

In one embodiment, the bluff body has a diameter of approximately 10 to 20 percent of the housing diameter, more preferably approximately 16 percent of the housing diameter. In another embodiment, the bluff body is disposed substantially transverse the longitudinal axis.

In another embodiment, the orifice plate has an orifice plate thickness, wherein the orifice plate thickness is within the range of 2 to 4 percent of the housing diameter. In another embodiment, the orifice plate has an orifice plate diameter, wherein the orifice plate diameter is substantially equal to the housing diameter. In another embodiment, the orifice has an orifice diameter that is about 60 percent of the housing diameter.

In one embodiment, the defined distance between the orifice plate and the bluff body is a distance of about 40 to 60 percent, preferably about 50 percent of the housing diameter. In another embodiment, the housing diameter is about 20 to 30 percent, preferably about 25 percent of the housing length. In another embodiment, the bluff body is located at a distance from the inlet of approximately 5 to 15 percent, preferably 10 percent of the housing length. In another embodiment, the bluff body is disposed within the housing such that the bluff body extends from the outer shell and through the axis of the housing, such that the bluff body is operable to transverse the flow of process fluids. In another embodiment, the orifice is centered about the axis of the housing. In another embodiment, the housing is substantially cylindrical. In another embodiment, the housing diameter remains substantially constant about the housing length. In another embodiment, the pulsating flow meter does not have a tapered section down stream of the bluff body.

In another embodiment, the pulsating flow meter can include a housing having an inner volume, an inlet for receiving process fluid from the process fluid flow conduit into the inner volume, and an outlet for delivering the process fluid from the inner volume into the process fluid flow conduit, wherein the housing defines the interior of the housing having a longitudinal housing length and a radial housing diameter, the housing further defining a longitudinal axis, wherein the housing diameter is about 25 percent of the housing length. The pulsating flow meter also includes a bluff body disposed within the housing, the bluff body having a substantially cylindrical shape such that the bluff body is operable to impart a vortex flow pattern on the process fluid that flows past the bluff body, the vortex flow pattern having a vortex frequency, wherein the bluff body has a diameter of approximately 16 percent of the housing diameter, wherein the bluff body is located at a distance from the inlet of approximately 10 percent of the housing length. The pulsating flow meter also includes an orifice plate disposed within the housing, the orifice plate comprising an orifice, an orifice plate thickness, and an orifice plate diameter, wherein the orifice plate is located down stream of the bluff body at a defined distance from the bluff body such that the orifice plate is operable to impart a pulsating flow on the process fluid as a result of passing through the orifice, the pulsating flow having a pulsating frequency, wherein the orifice thickness is within the range of 2 to 4 percent of the housing diameter, wherein the orifice plate diameter is substantially equal to the housing diameter, wherein the orifice is about 60 percent of the housing diameter, wherein the defined distance between the orifice plate and the bluff body is a distance of about 50 percent of the housing diameter. The pulsating flow meter can also include means to detect the pulsating frequency of the pulsating flow and determine the fluid flow rate based on the detected pulsating frequency.

In another embodiment, the pulsating flow meter is adapted to use the pulsating frequency and the pulsating amplitude to determine the fluid flow rate. The pulsating flow meter can include a bluff body operable to impart a vortex flux pattern on process fluid that flows past the bluff body, the vortex flow pattern having a vortex frequency; and an orifice plate disposed within the housing and having an orifice, the orifice plate located down stream of the bluff body, the orifice plate located a defined distance from the bluff body such that the orifice plate is operable to impart a pulsating flow on process fluid as a result of passing through the orifice, the pulsating flow having a pulsating frequency, the pulsating frequency having a pulsating amplitude. In another embodiment, the pulsating flow meter can be calibrated with correlation data for a plurality of different fluid phase compositions and a plurality of different total volume fluid flow rates having corresponding pulsating frequency and pulsating amplitude values.

Embodiments of the present invention also provide for a method for determining a fluid flow rate within a process fluid flow conduit. In one embodiment, the method can include the steps of flowing a process fluid through a pulsating flow meter that is operable to impart a pulsating flow on the process fluid, the pulsating flow having a pulsating frequency, the pulsating frequency having a pulsating amplitude; detecting the pulsating frequency; and determining the fluid flow rate based upon the detected pulsating frequency. In another embodiment, the method can be practiced with any of the pulsating flow meters described above.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In an embodiment of the present invention, a pulsating vortex meter is provided which advantageously can help compensate for applications having weak noise-to-flow ratio. In an embodiment, an orifice plate is placed at a defined distance from the bluff body such that the orifice plate is operable to impart a pulsating flow (as opposed to vortex shedding) on the process fluid when the process fluid flows through the orifice of the orifice plate.

Figure 4:
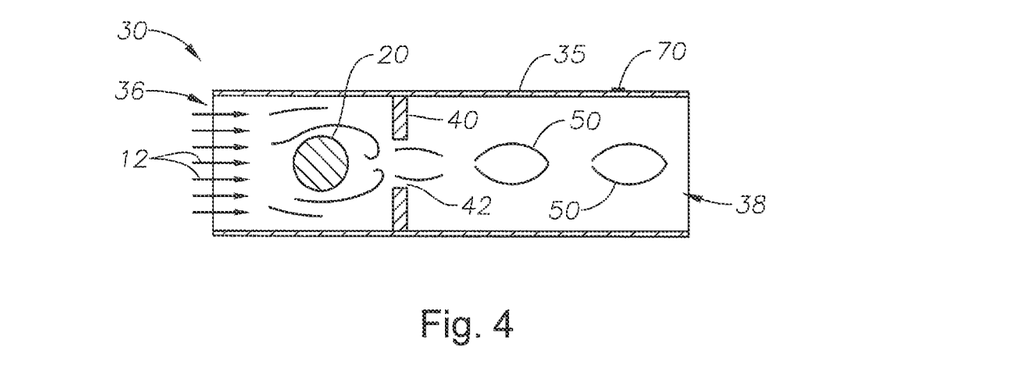
FIG. 4 is a top sectional view of a pulsating flow meter according an embodiment of the present invention.

FIG. 4 is a top sectional view of an embodiment of the present invention. Process fluid 12 enters outer shell 35 via inlet 36. Process fluid 12 flows past bluff body 20, and due to the boundary effects of bluff body 20, begins to exhibit the beginnings of a vortex shedding. However, orifice plate 40 prevents the process fluid from fully experiencing vortex shedding. Instead, the process fluid, after passing through orifice 42, is transformed into a pulsating flow having a pulsating frequency, which is exhibited by pulsations 50. The pulsating flow having a pulsating frequency exhibited by pulsations 50, can be detected by means to detect the pulsating frequency of the pulsating flow 70 downstream of orifice plate 40.

Figure 5:
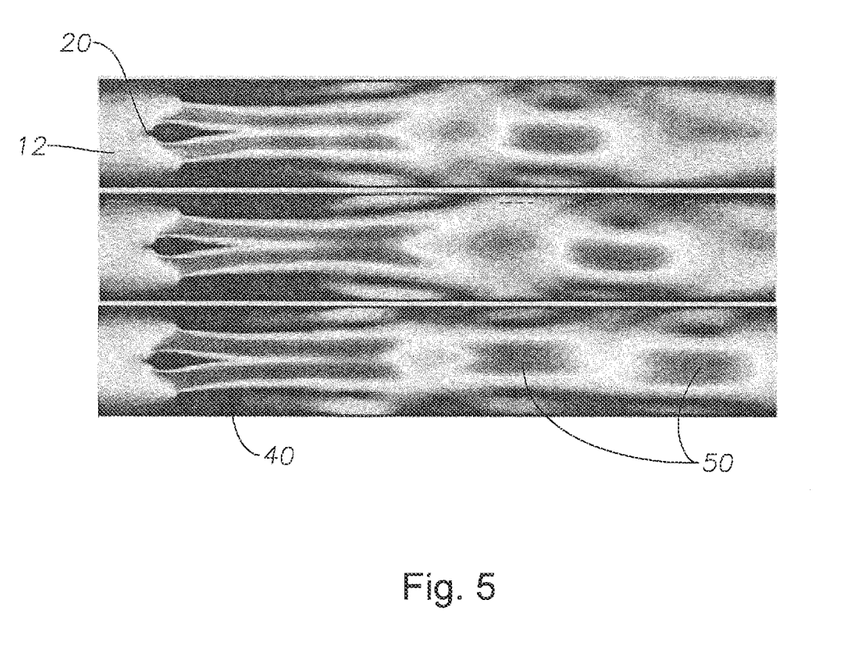
FIG. 5 displays a computational flow simulation of a pulsating flow meter according an embodiment of the present invention.

FIG. 5 is a compilation of three snapshots from a series of computation flow modeling performed in accordance with an embodiment of the invention. As seen in FIG. 5, each pulsation is completely detached from its predecessor, as well as possesses a defined pulsation core of high intensity.

Figure 6:
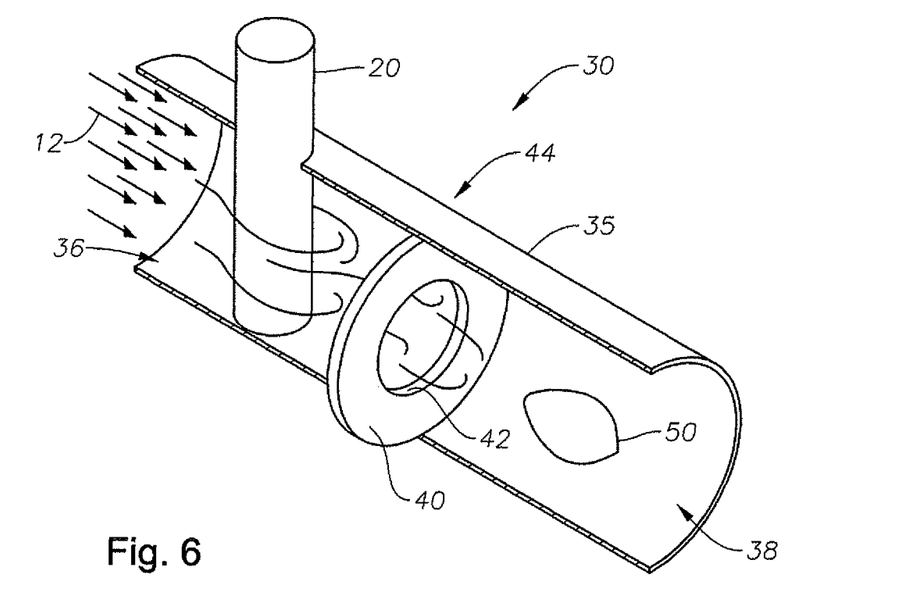
FIG. 6 is a perspective view of a pulsating flow meter according an embodiment of the present invention.

FIG. 6 is a perspective view of pulsating flow meter 30. Process fluid enters housing 44 at inlet 36 from a process fluid flow conduit (not shown). The process fluid flows around bluff body 20 and through orifice 42 of orifice plate 40. The process fluid continues to travel through the interior of housing 44; however, after passing through orifice 42, the process fluid begins to exhibit a pulsating flow, which is characterized by a plurality of pulsations 50. Pulsations 50 exit housing 44 at outlet 38, where it reenters the process fluid flow conduit (not shown).

Figure 7:
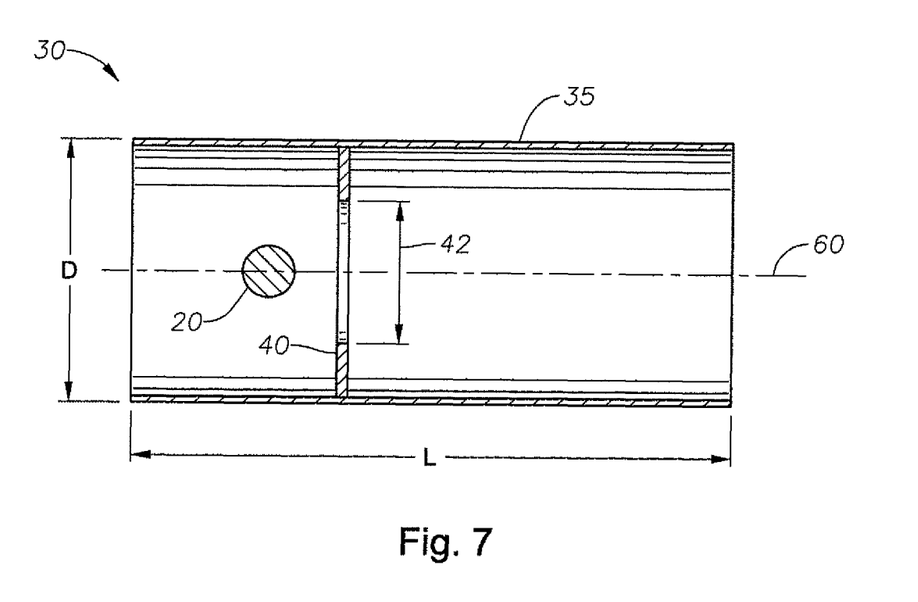
FIG. 7 is another top sectional view of a pulsating flow meter according an embodiment of the present invention.

FIG. 7 is another top sectional view of an embodiment of the present invention. In this embodiment, pulsating flow meter 30 includes radial housing diameter D, longitudinal axis 60, and longitudinal housing length L.

Figure 8:
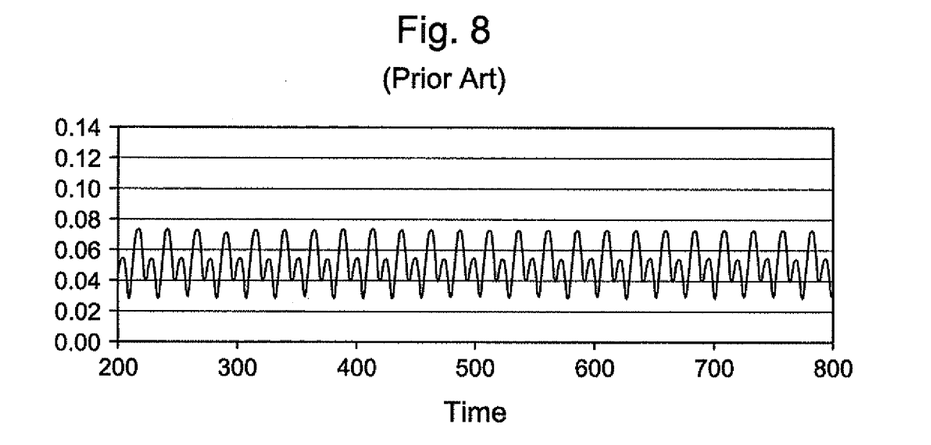
FIG. 8 is a graphical representation of the signal resulting from the Karman vortex street using a vortex flow meter in accordance with those known in the prior art.
Figure 9:
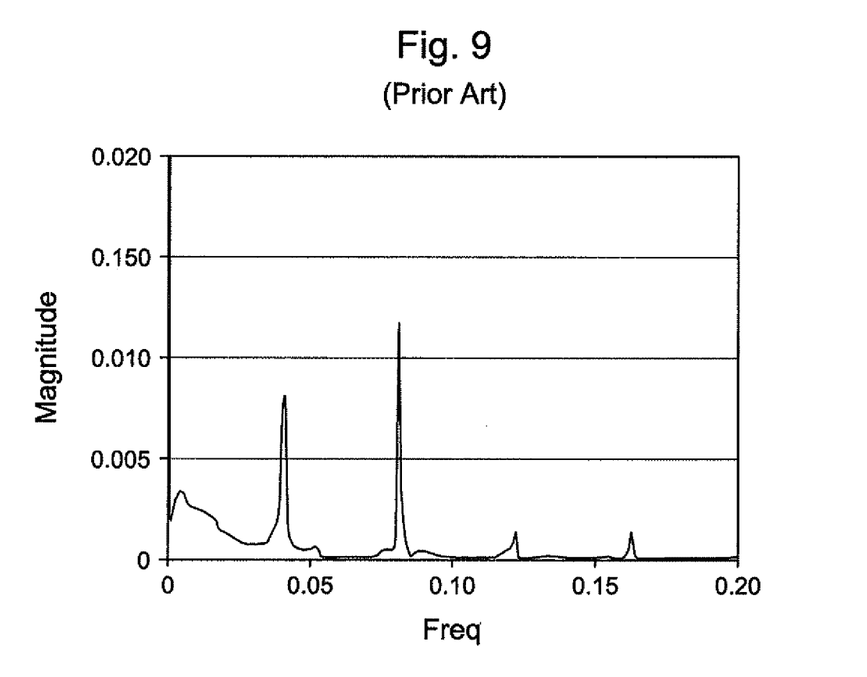
FIG. 9 is a Fourier transform of FIG. 8.

FIG. 8 and FIG. 9 are graphical representations of the signals resulting from a typical vortex flow meter of the prior art. FIG. 8 represents the signal resulting from the Karman vortex street. FIG. 9 shows the resulting Fourier transform, which clearly shows a singular characteristic frequency and its harmonics corresponding to the frequency of the vortex shedding.

Figure 10:
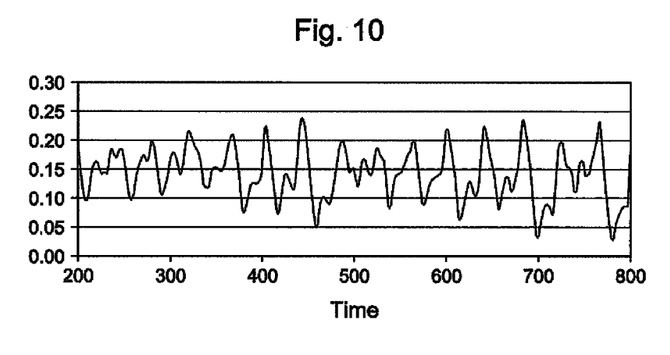
FIG. 10 is a graphical representation of the signal resulting from the pulsating flow meter according to an embodiment of the present invention.
Figure 11:
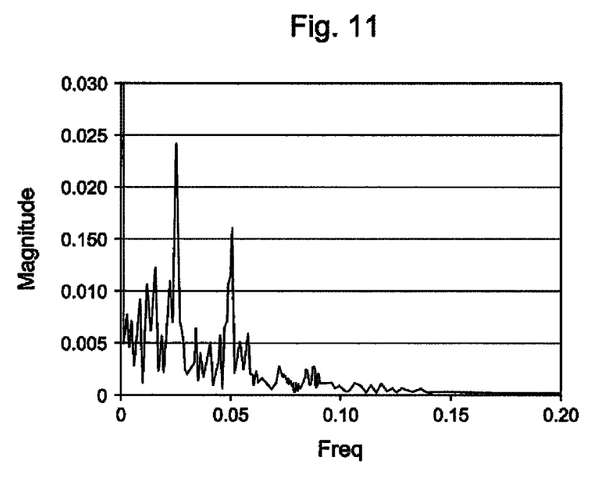
FIG. 11 is a Fourier transform of FIG. 10.

FIGS. 10 and 11 are graphical representations of the signals resulting from using a pulsating flow meter in accordance with an embodiment of the present invention. FIG. 10 represents the signal resulting from the pulsation mechanisms. FIG. 11 shows the resulting Fourier transform. This analysis has shown that the pulsating frequency has a lower frequency compared to the Karman street vortices shown in FIGS. 8 and 9 for the same flow conditions (i.e., same geometry of the pipe and bluff body, same Reynolds number and same viscosity). As such, the pulsations in embodiments of the present invention have a larger period than the Karman vortices. Furthermore, the Fourier transform spectrum shown in FIG. 11 shows a characteristic frequency of about 0.025 Hz with an intensity of almost 0.025, which is higher than the intensity of the signal from the vortex flow meter (0.008) shown in FIGS. 8 and 9. As such, embodiments of the present invention experience a better noise-to-flow ratio. Therefore, noise filtering in embodiments of the present invention would generate less error than in conventional vortex meter based on the Karman vortices.

The present invention presents a new flow system based on vortex pulsating mechanism that has better accuracy compared to conventional vortex meters due to the fact that the vortices generated have stronger signal response and have higher streaming period both favorable for a high accuracy measurement.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

I claim:

1. A pulsating flow meter for determining a fluid flow rate within a process fluid flow conduit configured to convey process fluid in a downstream direction, the pulsating flow meter comprising:
   a housing, the housing defining an interior of the housing having a longitudinal housing length and a radial housing diameter, the housing further defining a longitudinal axis, the housing having:
      an outer shell,
      an inlet for receiving process fluid from the process fluid flow conduit into the interior of the housing, an outlet for delivering process fluid from the interior of the housing to the process fluid flow conduit, and a bluff body disposed within the housing;

an orifice plate disposed within the housing and having an orifice, the orifice plate located down stream of the bluff body, the orifice plate located a defined distance from the bluff body such that the orifice plate is operable to impart a pulsating flow on process fluid as a result of passing through the orifice, the pulsating flow having a pulsating frequency; and means to detect the pulsating frequency of the pulsating flow and determine the fluid flow rate based on the detected pulsating frequency.

2. The pulsating flow meter as claimed in claim 1, further comprising means for coupling the pulsating flow meter in fluid connection with the process fluid flow conduit.

3. The pulsating flow meter as claimed in claim 1, wherein the means to detect the pulsating frequency and determine the fluid flow rate based on the detected pulsating frequency further comprises:

a sensor operable to detect the pulsating frequency of the pulsating flow by sensing pressure differentials resulting from the pulsating flow;

a transmitter in communication with the sensor, the transmitter operable to generate a flow measurement signal based on the pressure differentials sensed by the sensor; and a processor in communication with the transmitter, the processor operable to receive the flow measurement signal and determine the fluid flow rate.

4. The pulsating flow meter as claimed in claim 3, further comprising a display means in communication with the processor, the display means operable to display the fluid flow rate.

5. The pulsating flow meter as claimed in claim 1, wherein the bluff body is substantially cylindrical.

6. The pulsating flow meter as claimed in claim 1, wherein the bluff body has a diameter of approximately 10 to 20 percent of the housing diameter.

7. The pulsating flow meter as claimed in claim 1, wherein the bluff body has a diameter of approximately 16 percent of the housing diameter.

8. The pulsating flow meter as claimed in claim 1, wherein the bluff body is disposed substantially transverse the longitudinal axis.

9. The pulsating flow meter as claimed in claim 1, the orifice plate further comprising an orifice plate thickness, wherein the orifice plate thickness is within the range of 2 to 4 percent of the housing diameter.

10. The pulsating flow meter as claimed in claim 1, the orifice plate further comprising an orifice plate diameter, wherein the orifice plate diameter is substantially equal to the housing diameter.

11. The pulsating flow meter as claimed in claim 1, wherein the orifice comprises an orifice diameter that is about 60 percent of the housing diameter.

12. The pulsating flow meter as claimed in claim 1, wherein the defined distance between the orifice plate and the bluff body is a distance of about 50 percent of the housing diameter.

13. The pulsating flow meter as claimed in claim 1, wherein the housing diameter is about 25 percent of the housing length.

14. The pulsating flow meter as claimed in claim 1, wherein the bluff body is located at a distance from the inlet of approximately 10 percent of the housing length.

15. The pulsating flow meter as claimed in claim 1, wherein the bluff body is disposed within the housing such that the bluff body extends from the outer shell and through the axis of the housing.

16. The pulsating flow meter as claimed in claim 1, wherein the orifice is centered about the axis of the housing.

17. The pulsating flow meter as claimed in claim 1, wherein the housing is substantially cylindrical.

18. The pulsating flow meter as claimed in claim 1, wherein the housing diameter remains substantially constant about the housing length.

19. The pulsating flow meter as claimed in claim 1, further comprising the absence of a tapered section down stream of the bluff body.

20. A pulsating flow meter for determining a fluid flow rate within a process fluid flow conduit configured to convey process fluid in a downstream direction, the pulsating flow meter comprising:

a housing having an inner volume, an inlet for receiving process fluid from the process fluid flow conduit into the inner volume, and an outlet for delivering the process fluid from the inner volume into the process fluid flow conduit, wherein the housing defines the interior of the housing having a longitudinal housing length and a radial housing diameter, the housing further defining a longitudinal axis, wherein the housing diameter is about 25 percent of the housing length;

a bluff body disposed within the housing, the bluff body having a substantially cylindrical shape, wherein the bluff body has a diameter of approximately 16 percent of the housing diameter, wherein the bluff body is located at a distance from the inlet of approximately 10 percent of the housing length;

an orifice plate disposed within the housing, the orifice plate comprising an orifice, an orifice plate thickness, and an orifice plate diameter, wherein the orifice plate is located down stream of the bluff body at a defined distance from the bluff body such that the orifice plate is operable to impart a pulsating flow on the process fluid as a result of passing through the orifice, the pulsating flow having a pulsating frequency, wherein the orifice thickness is within the range of 2 to 4 percent of the housing diameter, wherein the orifice plate diameter is substantially equal to the housing diameter, wherein the orifice is about 60 percent of the housing diameter, wherein the defined distance between the orifice plate and the bluff body is a distance of about 50 percent of the housing diameter; and means to detect the pulsating frequency of the pulsating flow and determine the fluid flow rate based on the detected pulsating frequency.

21. The pulsating flow meter as claimed in claim 20, wherein the bluff body is disposed within the housing such that the bluff body extends through the axis of the housing.

22. The pulsating flow meter as claimed in claim 20, wherein the orifice is centered about the axis of the housing.

23. The pulsating flow meter as claimed in claim 20, wherein the housing is substantially cylindrical.

24. The pulsating flow meter as claimed in claim 20, wherein the housing diameter remains substantial constant about the housing length.

25. The pulsating flow meter as claimed in claim 20, further comprising the absence of a tapered section down stream of the bluff body.

26. A pulsating flow meter for determining a fluid flow rate of at least one phase of a two or three phase fluid flow, the pulsating flow meter comprising:

a housing;

a bluff body disposed transversally within the housing; and an orifice plate disposed within the housing and having an orifice, the orifice plate located down stream of the bluff body, the orifice plate located a defined distance from the bluff body such that the orifice plate is operable to impart a pulsating flow on process fluid as a result of passing through the orifice, the pulsating flow having a pulsating frequency, the pulsating frequency having a pulsating amplitude, wherein the pulsating flow meter is adapted to use the pulsating frequency and the pulsating amplitude to determine the fluid flow rate.

27. The pulsating flow meter as claimed in claim 26, wherein the pulsating flow meter is calibrated with correlation data for a plurality of different fluid phase compositions and a plurality of different total volume fluid flow rates having corresponding pulsating frequency and pulsating amplitude values.

28. A method for determining a fluid flow rate within a process fluid flow conduit, the method comprising the steps of:

flowing a process fluid through a pulsating flow meter that is operable to impart a pulsating flow on the process fluid, the pulsating flow having a pulsating frequency, the pulsating frequency having a pulsating amplitude;

detecting the pulsating frequency; and determining the fluid flow rate based upon the detected pulsating frequency.

29. The method as claimed in claim 28, wherein the pulsating flow meter comprises:

a housing, the housing defining an interior of the housing having a longitudinal housing length and a radial housing diameter, the housing further defining a longitudinal axis, the housing having:

an outer shell, an inlet for receiving process fluid from the process fluid flow conduit into the interior of the housing, an outlet for delivering process fluid from the interior of the housing to the process fluid flow conduit, and a bluff body disposed within the housing;

an orifice plate disposed within the housing and having an orifice, the orifice plate located down stream of the bluff body, the orifice plate located a defined distance from the bluff body such that the orifice plate is operable to impart a pulsating flow on process fluid as a result of passing through the orifice, the pulsating flow having a pulsating frequency; and means to detect the pulsating frequency of the pulsating flow and determine the fluid flow rate based on the detected pulsating frequency.

30. The method as claimed in claim 28, wherein the pulsating flow meter comprises:

a housing having an inner volume, an inlet for receiving process fluid from the process fluid flow conduit into the inner volume, and an outlet for delivering the process fluid from the inner volume into the process fluid flow conduit, wherein the housing defines the interior of the housing having a longitudinal housing length and a radial housing diameter, the housing further defining a longitudinal axis, wherein the housing diameter is about 25 percent of the housing length;

a bluff body disposed within the housing, the bluff body having a substantially cylindrical shape, wherein the bluff body has a diameter of approximately 16 percent of the housing diameter, wherein the bluff body is located at a distance from the inlet of approximately 10 percent of the housing length;

an orifice plate disposed within the housing, the orifice plate comprising an orifice, an orifice plate thickness, and an orifice plate diameter, wherein the orifice plate is located down stream of the bluff body at a defined distance from the bluff body such that the orifice plate is operable to impart a pulsating flow on the process fluid as a result of passing through the orifice, the pulsating flow having a pulsating frequency, wherein the orifice thickness is within the range of 2 to 4 percent of the housing diameter, wherein the orifice plate diameter is substantially equal to the housing diameter, wherein the orifice is about 60 percent of the housing diameter, wherein the defined distance between the orifice plate and the bluff body is a distance of about 50 percent of the housing diameter; and means to detect the pulsating frequency of the pulsating flow and determine the fluid flow rate based on the detected pulsating frequency.

31. The method as claimed in claim 28, wherein the pulsating flow meter comprises:

a housing;

a bluff body disposed transversally within the housing; and an orifice plate disposed within the housing and having an orifice, the orifice plate located down stream of the bluff body, the orifice plate located a defined distance from the bluff body such that the orifice plate is operable to impart a pulsating flow on process fluid as a result of passing through the orifice, the pulsating flow having a pulsating frequency, the pulsating frequency having a pulsating amplitude, wherein the pulsating flow meter is adapted to use the pulsating frequency and the pulsating amplitude to determine the fluid flow rate.

\* \* \* \* \*